United States Patent [19]
Mori

[11] Patent Number: 5,310,213
[45] Date of Patent: May 10, 1994

[54] AIR BAG CASE

[75] Inventor: Shinji Mori, Aichi, Japan

[73] Assignee: Kabushiki Kaisha Tokai-Rika-Denki-Seisakusho, Japan

[21] Appl. No.: 974,872

[22] Filed: Nov. 12, 1992

[30] Foreign Application Priority Data

Nov. 25, 1991 [JP] Japan .................. 3-309298

[51] Int. Cl.⁵ .............................................. B60R 21/16
[52] U.S. Cl. ........................... 280/728 A; 280/732;
220/4.23; 220/7; 220/649; 220/DIG. 25
[58] Field of Search ............... 280/728 R, 728 A, 732,
280/743 R; 220/DIG. 25, 4.23, 7, 648, 649

[56] References Cited

U.S. PATENT DOCUMENTS

| | | | |
|---|---|---|---|
| 2,774,504 | 12/1956 | Moore | 220/DIG. 25 X |
| 3,223,309 | 12/1965 | Chiorri | 220/DIG. 25 X |
| 4,842,300 | 6/1989 | Ziomek et al. | 280/732 |
| 4,944,527 | 7/1990 | Bishop et al. | 280/741 |
| 5,074,585 | 12/1991 | Satoh | 280/728 A |

Primary Examiner—David M. Mitchell
Assistant Examiner—Andrew C. Pike
Attorney, Agent, or Firm—Sixbey, Friedman, Leedom & Ferguson

[57] ABSTRACT

An air bag case is provided with a main plate and a side plate to form a case. The main plate forms an opposing portion including a space for accommodating an inflator and a bag body, and is curved in a substantially U-shaped form to form a curved portion. A pair of side plate are formed by bending both sides of the main plate in the inner direction. The pair of side plates respectively form crossing portions for joining side edges of the opposing side plates, and form an opening forming portion for forming an inflator containing opening in the vicinity of the curved portion.

20 Claims, 7 Drawing Sheets

AIR BAG CASE

BACKGROUND OF THE INVENTION

1. Field of the Invention

The present invention relates to an air bag case used for an air bag apparatus, and containing an inflator and a bag body which is expanded by the inflator

2. Background Information

There are well-known air bag apparatus mounted in an instrument panel which is positioned in front of a front-seat passenger for protecting a front-seat passenger of a vehicle.

In the air bag apparatus, an air bag case accommodates a long cylindrical inflator and a bag body. In an emergency of the vehicle, the bag body is expanded by generating gas through a peripheral surface of the inflator.

The air bag case is provided in the form of a case by using a main plate and a pair of side plates perpendicular to the longitudinal direction of the inflator. The main plate is curved in a substantially U-shaped form so as to be opposed to a peripheral back portion and peripheral upper and lower portions of the inflator, and to extend toward a bag body expansion opening. The side plate is provided with an inflator containing opening.

In conventional air bags, the main plate and the side plate are separate members, and are connected by welding.

In the conventional air bag case, since the main plate and the side plate are separately provided, it is necessary to connect them by welding. However, a complicated operation is required for welding the entire critical portion having a long distance. Also a high dimensional accuracy can not be obtained. As a result, there are drawbacks of increased manufacturing cost and the like.

Further, when generating gas from the inflator, pressure in the air bag case increases considerably. Therefore, it is necessary to connect the main plate with the side plate with adequate rigidity so as to resist the pressure.

SUMMARY OF THE INVENTION

In view of the facts set forth above, it is an object of the present invention to provide an air bag case which can reduce the number of assemblies, facilitate processing for manufacturing, improve dimensional accuracy, reduce manufacturing cost, and can sufficiently resist pressure generated in the air bag case.

An air bag case of the present invention accommodates an inflator and a bag body. The inflator generates gas to expand the bag body when a vehicle rapidly decelerates. The air bag case includes a main plate portion including an intermediate portion which is curved so as to have a space for accommodating the inflator and the bag body inside the main plate, and a pair of side plate portions which is formed by bending both sides of the main plate portion in an inner direction of the main plate. The pair of side plate portions respectively serve to join side edges of the side plate portions opposed with each other, and forms an inflator accommodating opening which is provided in the side plate portions in the vicinity of the intermediate portion of the main plate portion.

According to the present invention constructed as set forth above, it is possible to expand the main plate portion and the side plate portion as a single plate member.

Therefore, the air bag case can be obtained by simply cutting the single plate member in an expanded form of the single plate member, providing processing, and bending so as to form the main plate portion and the side plate portions. The side plate portions are integrally provided with the main plate portion along both side edges of the main plate portion. Consequently, even if an operation such as welding is performed for forming the air bag case, it is possible to reduce a length of a connecting position which requires welding or the like.

Thereby, the main plate portion and the side plate portions are formed as the single plate member. Hence, there are several advantages such as the reduction of the number of assemblies, facilitation of processing, improvement of dimensional accuracy, and the reduction of cost. Further, the number of the connecting positions is reduced so that the air bag case can sufficiently resist pressure generated in the air bag case.

In a second aspect of the present invention, an air bag case accommodates an inflator and a bag body. The inflator is capable of generating gas to expand the bag body when a vehicle rapidly decelerates. The air bag case is provided with a main plate portion having an opposing portion forming a space for accommodating the inflator and the bag body inside the main plate, and having a curved portion which is curved to have a substantially U-shaped intermediate portion, and a pair of side plate portions formed by bending both sides of the main plate portion in an inner direction of the main plate portion. The pair of side plate portions respectively form crossing portions for joining side edges of the side plate portions opposed to each other, and form an opening forming portion forming an inflator accommodating opening which is provided in the vicinity of the curved portion.

According to the second aspect of the present invention, it is also possible to expand the main plate portion and the side plate portions of the air bag case of the second aspect as a single plate member as in the air bag case of the first aspect.

Therefore, the air bag case can be obtained by simply cutting the single plate member in an expanded form of the air bag case, bending, and joining the crossing portions provided for the side plates. If the crossing portions are joining by welding, a length of a welded portion can be reduced. Thereby, the main plate portion and the side plate portions are formed as the single plate member. Hence, there are several advantages such as the reduction of the number of assemblies, facilitation of processing, improvement of dimensional accuracy, and the reduction of cost. On the other hand, the side plate portions are formed by curving the side plate portions along the side edges of the main plate portion. Accordingly, only the connecting position to join the crossing portions requires the joining for forming the air bag case. As a result, the air bag case can sufficiently resist the pressure generated in the air bag case. Further, the inflator accommodating opening is formed between an opening forming portion and the crossing portion of the side plate by curving the intermediate portion of the main plate portion. A peripheral edge portion of the inflator accommodating opening has increased strength so as to resist the pressure generated in the air bag case even more effectively. The crossing portions of the side plate portions are opposed to each other at the intermediate portion between the side edges of the opposing portions of the main plate portion by curving the intermediate portion of the main plate portion. Accordingly, in the expanded form of the air bag case, portions corresponding to the side plate portions symmetrically provided along the both ends directions of portions corresponding to the main plate portion. Therefore, it is possible to improve yield of the single plate member in case the expanded form of the air bag case is obtained from the single plate member by, for example, cutting the single plate member.

Further, the air bag case of the second aspect is provided with a joining member for joining the crossing portions. The opening portion of the bag body is mounted through the joining member so that the bag body is mounted and the crossing portions can be concurrently joined to each other.

DESCRIPTION OF THE PREFERRED EMBODIMENTS

A description will now be given of a first embodiment of an air bag case according to the present invention with reference to FIGS. 1 to 5.

Figure 2:
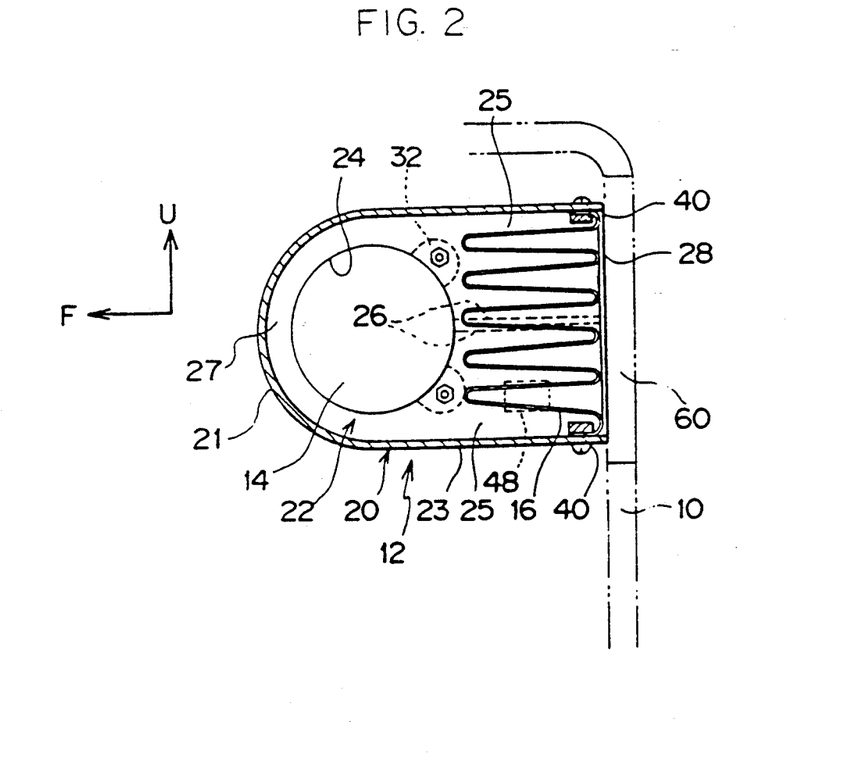
FIG. 2 is a sectional view illustrating the air bag apparatus employing the air bag case according to the first embodiment of the present invention, seen from the cross direction of a vehicle.

FIG. 2 illustrates an air bag case 12 mounted in an instrument panel 10 which is positioned in front of a front-seat passenger as shown by the arrow marked F. The arrow marked U in FIG. 2 illustrates the vehicle roof direction. As forwardly seen from the side of the front-seat passenger, an inflator 14 is accommodated at the back of the air bag case 12, and a bag body 16 is accommodated on this side of the air bag case 12. The inflator 14 and the bag body 16 are provided to form the air bag apparatus for the front-seat passenger.

Figure 1:
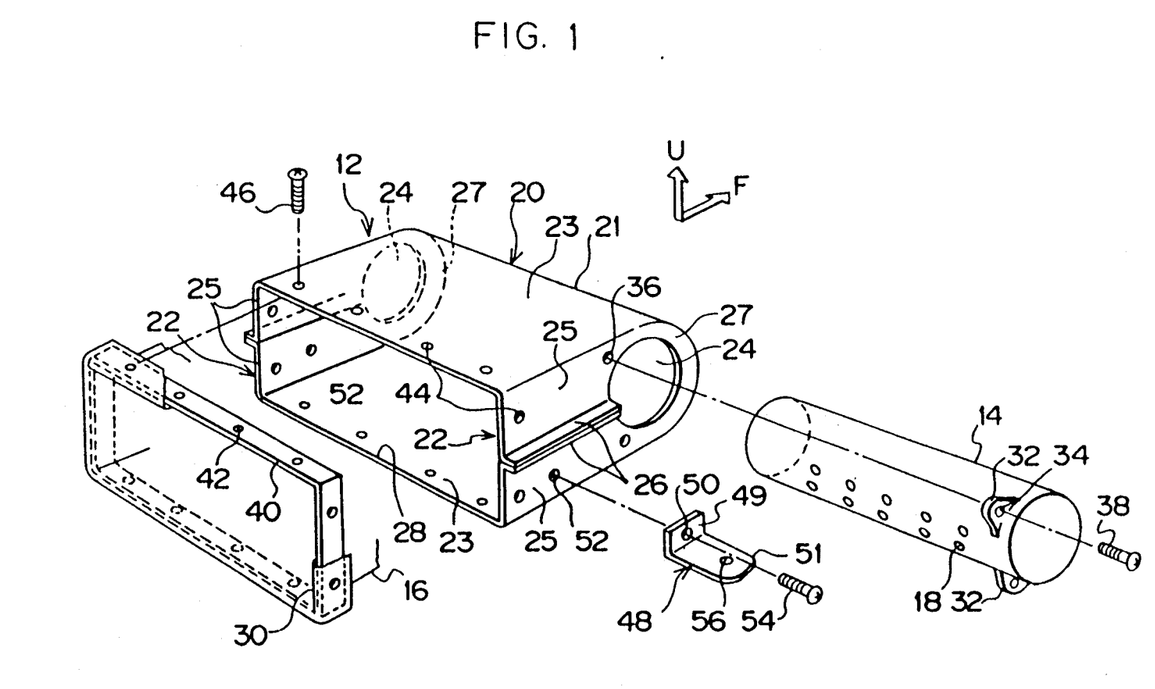
FIG. 1 is an exploded perspective view of an air bag apparatus employing an air bag case according to a first embodiment of the present invention.

The inflator 14 is provided to have a long cylindrical form extending laterally as forwardly seen from the front-seat passenger. The bag body 16 is folded to be opposed to a rear surface of the inflator 14. The inflator 14 is filled with gas generating material, and many gas openings 18 are provided in a peripheral surface of the inflator 14 as shown in FIG. 1. When the vehicle rapidly decelerates, gas is generated from the inflator 14 by an unillustrated ignition means which is operated by an unillustrated acceleration sensor. The generated gas is injected from a gas opening 18 into the bag body 16 so as to expand the bag body 16.

As shown in FIGS. 1 and 2, the air bag case 12 is provided with a main plate 20 opposed to the peripheral surface of the inflator 14, and a pair of side plates 22 perpendicular to the longitudinal direction of the inflator 14 thereby having a box-like structure.

An intermediate portion of the main plate 20 serves as a curved portion 21 which is curved in a semicircular form along a peripheral portion of the inflator 14. Both ends of the main plate 20 are opposed in parallel with each other so as to serve as a pair of opposing portions 23 extending toward a bag body expansion opening 28 (on the side of the front-seat passenger). The main plate 20 is substantially U-shaped as seen from the lateral directions of the vehicle.

Both side edges of a long plate type of main plate 20 are bent at right angles along the longitudinal direction of the main plate 20 to form a pair of side plates 22. The respective side plates 22 are provided with a pair of crossing portions 25 and an opening forming portion 27. The pair of crossing portions 25 serve to join side edges of the opposing portions 23. The opening forming portion 27 serves to join the pair of crossing portions 25 with side edges of the curved portion 21 of the main plate 20. An inflator containing opening 24 is interposed between the pair of crossing portions 25 and the opening forming portion 27. The pair of crossing portions 25 of the respective side plates 22 are opposed to each other at an intermediate portion disposed between the side edges of the opposing portions 23. Further, flanges 26 are provided at the respective end portions of the opposing crossing portions 25. The flanges 26 are folded at right angles to the outside of the cross direction of the vehicle. The opposing flanges 26 are in contact with each other, and are joined by welding so as to join the side edges of the opposing portions 23.

As shown in FIG. 1, a pair of projections 32 are provided on the peripheral portion in the vicinity of one end of the inflator 14. A bolt hole 34 is provided in the respective projections 32. A bolt hole 36 is provided in the side plate 22 corresponding to the bolt hole 34 in the peripheral edge portion of the supporting hole 24. Hence, a bolt 38 can pass through the bolt hole 34 of the projection 32 of the inflator 14 from the outside of the side plate 22 with both ends of the inflator 14 passing through the supporting hole 24. Further, the bolt 38 is screwed into the bolt hole 36 of the side plate 22 so that the inflator 14 can be fixed through the projection 32 on the side plate 22.

As shown in FIGS. 1 and 2, an opening portion 30 of the bag body 16 is outwardly folded and sewn to form a bag-shaped portion. A frame metal 40 is included in the bag-shaped portion. A plurality of female screws 42 are provided in the frame metal 40 along the circumferential direction of the frame metal 40. A plurality of bolt holes 44 are provided in the main plate 20 and the side plate 22 at an expansion opening 28 of the air bag case 12 so as to correspond to the female screws 42 of the frame metal 40. Bolts 46 pass through the respective bolt holes 44 of the main plate 20 and the side plate 22 from the outside of the air bag case 12. Subsequently, the bolts 46 pass through the bag-shaped portion outwardly folded at the opening portion 30 of the bag body 16, and are screwed into female screws 42 of the frame metal 40 for clamping. Accordingly, the bag body 16 can be mounted on the bag body expansion opening 28 of the air bag case 12 through the frame metal 40.

An L-shaped mounting portion 48 is provided on an outer surface of the side plate 22. The mounting portion 48 can be fixed to the side plate 22 by a bolt 54 passing through a bolt hole 50 provided in one part 49 of the mounting portion 48, and the bolt 54 passing through a bolt hole 52 provided in the side plate corresponding to the one part 51. On the other hand, a mounting hole 56 is provided in the other part of the mounting portion 48. The mounting portion 48 is fixed with a bolt (not shown) to the instrument panel 10 through the mounting hole 56. As a result, the air bag case 12 can be provided in the instrument panel 10.

As shown in FIG. 2, the instrument panel 10 is provided with a cover 60 which is opposed to the expansion opening 28 of the air bag case 12. When the bag body 16 is expanded, the cover 60 expands by the expanding pressure. Consequently, the bag body 16 can be expanded toward the front-seat passenger.

According to the air bag case 12 constructed as set forth above, the main plate 20 and the side plate 22 can be expanded into a single plate member. Accordingly, the air bag case 12 is configured from the single plate member. One embodiment of a procedure for assembling the air bag case 12 will be described hereinafter.

Figure 3:
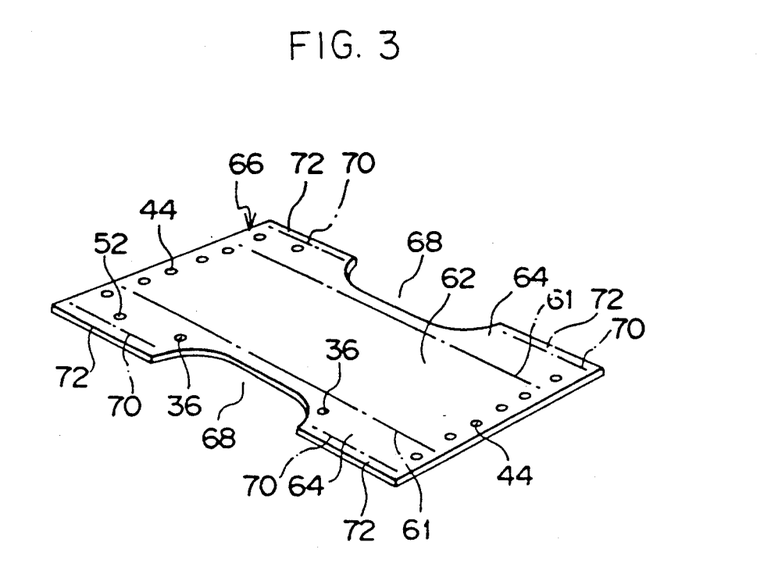
FIG. 3 is an expanded view of the air bag case according to the first embodiment of the present invention.

Referring now to FIG. 3, an expansion plate 66 is provided by cutting or punching a flat single plate member. The expansion plate 66 is provided with a main part 62 and side parts 64. The main part 62 later serves as the main plate 20. The side parts 64 are extended in the respective lateral directions of the main part 20 through critical lines 61 shown by the one dot chain lines in FIG. 3, so as to serve as the side plates 22 later. The expansion plate 66 has a slightly elongated plate form including the critical lines 61 as the longitudinal direction. Notch portions 68 are provided at a longitudinal intermediate portions of the side parts 64 and later serve as an inflator accommodating opening 24. The notch portions 68 are provided apart from the critical line 61. Further, flange parts 72 are provided at edges of the side parts 64, except along the notch portions 68, and later serve as the flanges 26 through a critical lines 70 shown by the one dot chain lines provided in parallel with the critical line 61.

Bag body mounting bolt holes 44 are provided in the longitudinal both ends of the expansion plate 66. Inflator fixing bolt holes 36 are provided around the periphery of one notch portion 68 of one of the side parts 64. A mounting portion fixing bolt hole 52 is provided in the side part 64.

Figure 4:
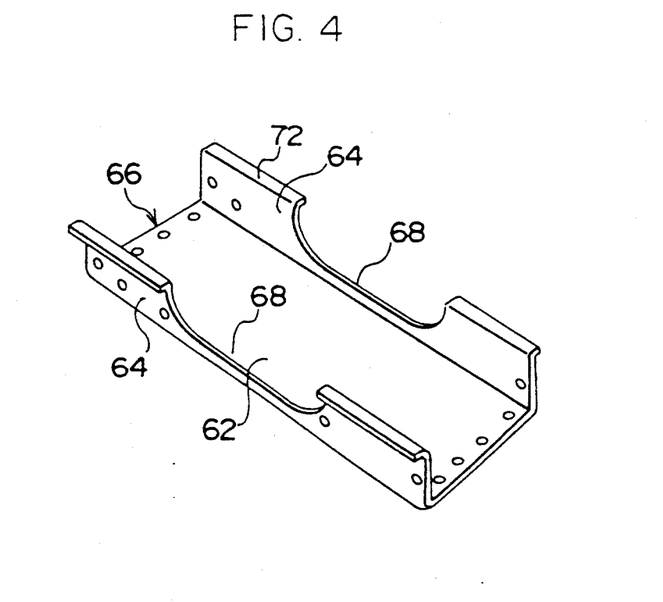
FIG. 4 is a view illustrating a manufacturing step of the air bag case according to the first embodiment of the present invention.

Next, the expansion plate 66 is folded along the critical lines 61, and curved perpendicular to the main part 62 as shown in FIG. 4. Further, the flange parts 72 are folded toward the outside in the cross direction of the expansion plate 66, and folded perpendicular to the side parts 64.

Figure 5:
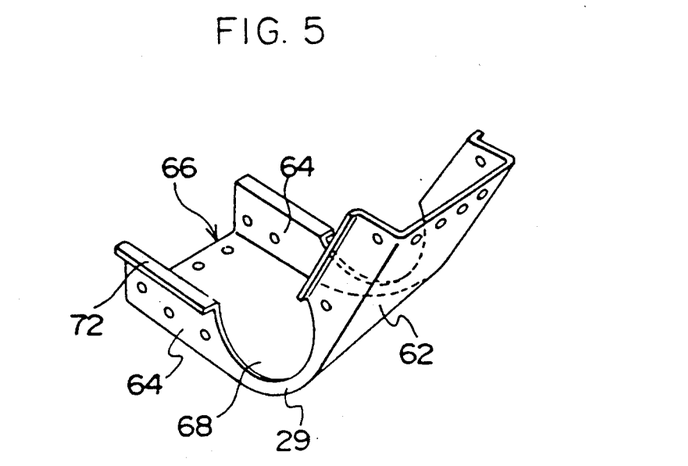
FIG. 5 is a view illustrating a manufacturing step after the manufacturing step of FIG. 4.

Subsequently, as shown in FIG. 5, a longitudinal intermediate portion of the main part 62 is curved to have a longitudinal semicircular intermediate portion, and to have longitudinal both ends extending in parallel and opposed with each other. Thus, the main part 62 can serve as the main plate 20, the side parts 64 can serve as the side plate 22, and the opposing flange parts 72 are in contact with each other to serve as the flanges 26. As a result, the formation of the air bag case 12 can be obtained. In this case, peripheral edges 29 of the notch portions 68 (which are at positions later serving as the opening forming portions 27) are pressed and curved to form the inflator containing openings 24 at the notch portions 68.

Thereafter, welding is performed between the flange parts 72, i.e., between the flanges 26. The bag body expansion opening 28 is formed at the end of the main part 62 and the end of side parts 64, i.e., at the end of the main plate 20 and the end of the side plates 22.

As set forth hereinbefore, it is possible to obtain the air bag case 12 by simply cutting the single plate member to form the expanded formation of the air bag case 12, bending, and joining the crossing portions 25 of the side plate 22. When the crossing portions 25 of the side plate 22 are joined by welding, a length of a connecting position requiring welding can be reduced.

Therefore, it is possible to reduce the number of assemblies, facilitate processing, improve dimensional accuracy, and reduce cost because of the main plate 20 and the side plate 22 being constructed as a single plate member.

The side plate 22 is bent along the side edge of the main plate 20 to reduce the number of positions requiring joining. As a result, the side plate 22 can efficiently resist the pressure generated in the air bag case 12. Further, the opening forming portion 27 of the side plate 22 corresponding to the peripheral edge of the inflator accommodating opening 24, is pressed and bent. Accordingly, the pressed and bent position has increased strength so as to further efficiently resist the pressure generated in the air bag case 12.

The crossing portions 25 of the side plate 22 are opposed to each other at the intermediate portion between side edges of the opposing portions 23 of the main plate 20 by curving the intermediate portion of the main plate 20. Consequently, in the expanded formation of the air bag case, the side parts 64 corresponding to the side plates 22 can be symmetrically obtained along the longitudinal direction of the main part 62 corresponding to the main plate 20. That is, the side parts 64 outwardly extend from the main plate 20 in the cross directions, and have the same length from the longitudinal both ends of the main plate. Hence, when the expansion plate 66 of the air bag case is obtained from a single plate by cutting the single plate, yield on the plate can be increased.

Figure 6:
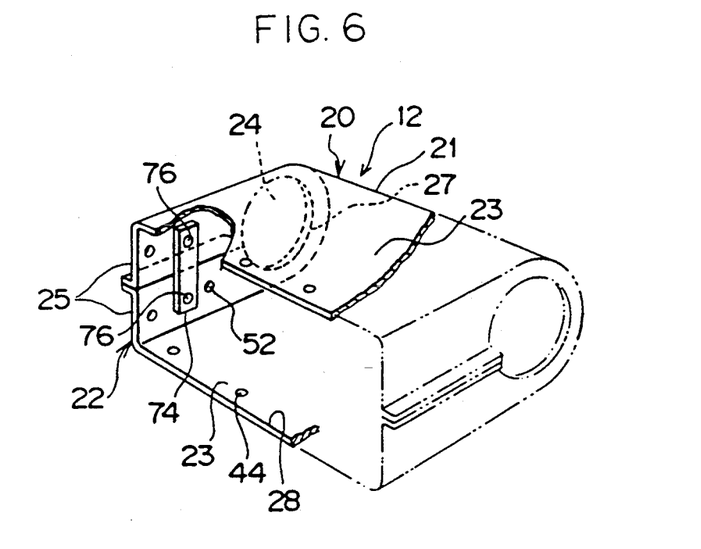
FIG. 6 is a perspective view of the air bag case according to the first embodiment of the present invention, employing a coupling plate to join crossing portions of side plates with each other.

Instead of welding between the flanges 26, a long plate type of coupling plate 74 may be used to extend between the crossing portions 25 of the side plates 22 in the air bag case 12 as shown in FIG. 6. Female screws are provided in the vicinity of the respective ends of the coupling plate 74, and bolts 76 respectively passing through the crossing portions 25 of the side plates 22 are screwed to clamp the crossing portions 25 and the coupling plate 74. Consequently, the crossing portions 25 of the side plates 22 can be joined with each other. As a result, the coupling plate 74 can form a coupling member serving as another joining structure for coupling the crossing portions 25 of the side plates 22.

The frame metal 40 of the bag body 16 is mounted on the bag body expansion opening 28 to couple the crossing portions 25 of the side plates 22. Accordingly, the frame metal 40 also forms a coupling member serving as the coupling structure as set forth above. The frame metal 40 serves to mount the bag body 16 and concurrently couple the crossing portions 25 of the side plates 22. Further, the crossing portions 25 of the side plates 22 are joined by the frame metal 40 as well as by welding or the coupling plate 74. As a result, the crossing portions 25 of the side plates 22 can be further rigidly coupled. Alternatively, it is possible to rigidly couple opposing ends of the side plates 22 by simply mounting the bag body 16 through the frame metal 40 instead of welding or using the coupling plate 74.

Figure 7:
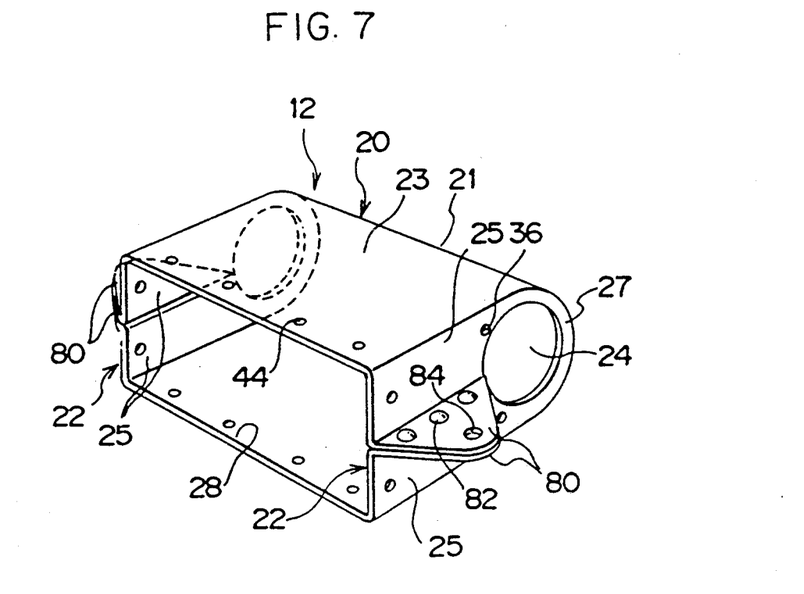
FIG. 7 is a perspective view of an air bag case according to a second embodiment.

Referring now to FIG. 7, a second embodiment will be described hereinafter.

In this embodiment, elongated triangular flanges 80 outwardly extend from the crossing portions 25 of the side plates 22, and the respective flanges 80 are fastened by rivets 82 to join the respective crossing portions 25 of the side plates 22. A mounting hole 84 is provided in a top portions of the extending triangular flanges 80 so as to fix the flanges 80 by a bolt to the instrument panel 10 (see FIG. 2) through the mounting hole 84.

According to this embodiment, when the air bag case 12 is provided in the instrument panel 12, the mounting portion 48 used in the first embodiment may be omitted so as to reduce the number of assemblies and manufacturing cost.

Figure 8:
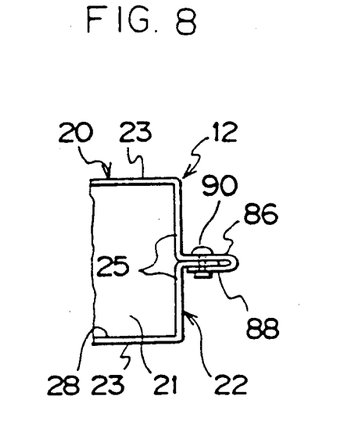
FIG. 8 is a front view of a main portion illustrating an air bag case according to a third embodiment, seen from the expanding opening side.

Bolts may be substituted for the rivet 82, or the crossing portions 25 of the side plates 22 may be coupled or joined by welding or coupling members 74 described in the first embodiment. Further, the frame metal 40 of the bag body 16 forms a coupling member when the bag body 16 is mounted on the bag body expansion opening 28 as described in the first embodiment. Therefore, the frame metal 40 of the bag body 16 can serve to join the crossing portions 25 of the side plate 22 further rigidly. It is also possible to join the crossing portions 25 of the side plates 22 sufficiently rigid by simply using the frame metal 40 of the bag body 16. Referring now to FIG. 8, a third embodiment will be described hereinafter.

In this embodiment, rectangular flanges 86 and 88 are employed instead of the triangular flanges 80 used in the second embodiment. These flanges of the crossing portions 25 of the side plates 22 are in contact with each other. One flange 86 (an upper side flange in FIG. 8) sandwiches and engages the other flange 88 (a lower side flange in FIG. 8). In this condition, a rivet 90 passes through the respective flanges 86, 88 so they are fastened with each other and thereby coupling the crossing portions 25 of the side plates 22.

Since the respective flanges 86 and 88 are fastened by the rivet 90 after the one flange 86 is sandwiched to engage the other flange 88, the crossing portions 25 of the side plates 22 can be rigidly joined.

As in the case of the second embodiment, when the air bag case 12 is provided in the instrument panel 10, the mounting portion 48 used in the first embodiment may be omitted if the mounting hole 84 is provided in the respective flanges 86 and 88 as in the second embodiment.

A bolt may be employed instead of the rivet 90. The frame metal 40 of the bag body 16 forms the coupling member when the bag body 16 is mounted on the bag body expansion opening 28 as described in the first embodiment. Therefore, the frame metal 40 of the bag body 16 can serve to further rigidly couple the crossing portions 25 of the side plates 22. It is also possible to join the opposing ends of the side plates 22 sufficiently rigid by simply using the frame metal 40 of the bag body 16.

Figure 9:
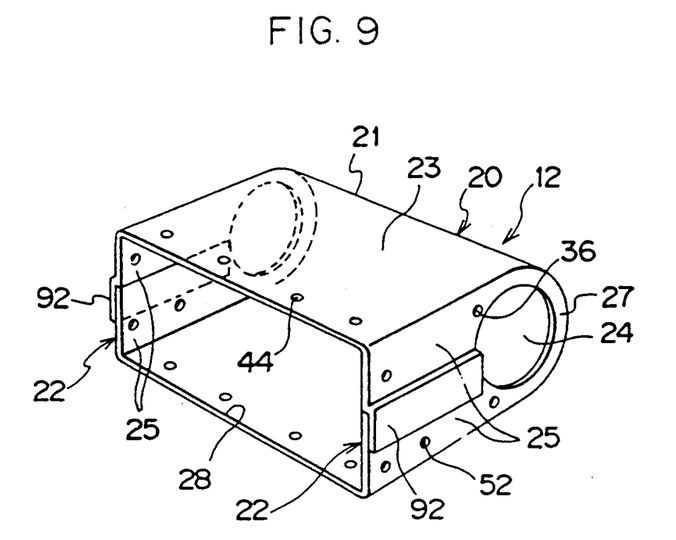
FIG. 9 is a perspective view of an air bag case according to a fourth embodiment.

Referring now to FIG. 9, a fourth embodiment will be described hereinafter.

In this embodiment, a stage portion 92 is provided for one of a pair of opposed crossing portions 25 of the side plates 22 (an upper side crossing portion 25 in FIG. 9) without providing flanges with the crossing portions 25 of the side plates 22. The stepped portion 92 is connected to an outer surface of the other crossing portion (a lower crossing portion 25 in FIG. 9) so as not to form any step on inner surfaces of the respective crossing portions 25 of the side plates 22. The connecting position is welded to join the crossing portions 25 of the side plates 22.

A bolt or a rivet may be employed instead of welding. The frame metal 40 of the bag body 16 forms a coupling member when the bag body 16 is mounted on the bag body expansion opening 28 as described in the first embodiment. Therefore, the frame metal 40 of the bag body 16 can serve to further rigidly couple the crossing portions 25 of the side plates 22. It is also possible to join the crossing portions 25 of the side plates 22 sufficiently rigid by simply using the frame metal 40 of the bag body 16.

Figure 10:
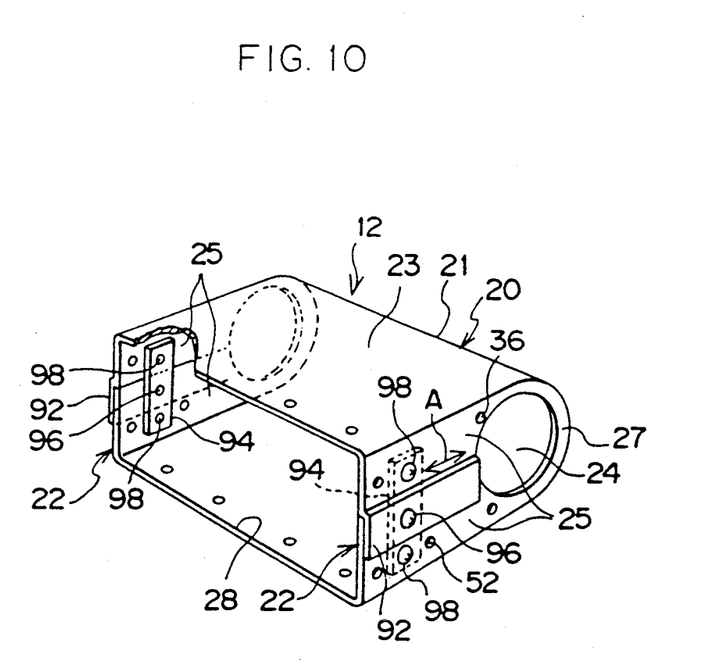
FIG. 10 is a perspective view of an air bag case according to a fifth embodiment.

Referring now to FIG. 10, a fifth embodiment will be described hereinafter.

In this embodiment, a long plate type of coupling plates 94 forming the coupling member are positioned in the air bag case 12 to join the crossing portions 25 of the side plates 22 without welding the connecting position of the crossing portions 25 of the side plates 22 as in the fourth embodiment. A bolt 96 passes through the connecting position of the crossing portions 25 of the side plates 22. The bolt 96 is screwed into one of three female screws provided along the longitudinal direction of the coupling plate 94, i.e., a female screw which is positioned in an intermediate portion. Bolts 98 pass through upper and lower portions deviated from the connecting position of the crossing portions 25 of the side plates 22. Further, the bolts 98 are screwed into the female screws positioned in both the ends.

Consequently, the connecting position of the crossing portions 25 of the side plates 22 is fastened by one of the bolts 96 and 98 for joining the crossing portions 25 of the side plates 22, i.e., the bolt 96 which is intermediately positioned. Therefore, it is possible to provide good resistance against forces exerting in the direction (which is shown by the arrow marked A in FIG. 10) in which the crossing portions 25 of the side plates 22 are laterally deviated. As a result, rigid joining is available.

In the embodiment, the coupling plate 94 is employed. However, three female screws 42 may be provided in a frame part 97 corresponding to the crossing portions 25 of the side plates 22 in a frame metal 99 of the bag body 16 as shown in a sixth embodiment of FIG. 11. When the frame metal 99 of the bag body 16 is mounted on the bag body expansion opening 28, the bolt 96 passing through the connecting position of the opposing ends of the side plate 22 is screwed into the female screw which is intermediately positioned in the frame part 97. Concurrently, the bolts 98 pass through the upper and lower portions deviated from the connecting position of the crossing portions 25 of the side plate 22, and are screwed into the female screws which are positioned in both ends of the frame part 97. Thus, it is possible to obtain the same effect of the operation as in the case of using the coupling plate 94 of the fifth embodiment.

Figure 11:
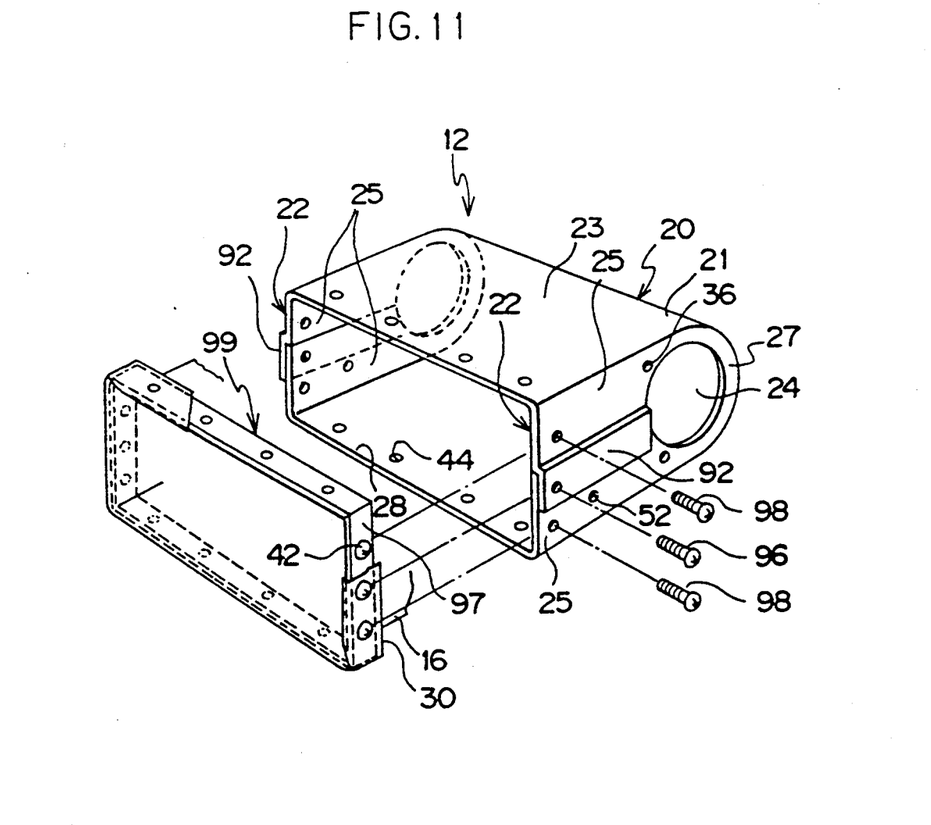
FIG. 11 is a perspective view of an air bag case according to a sixth embodiment.

Accordingly, it is possible to mount the bag body 16 and concurrently join the crossing portions 25 of the side plates 22, and to improve rigid joining between the crossing portions 25 of the side plates 22 by simply using the frame metal 99.

The present invention has been described according to the embodiments hereinbefore. However, it must be noted that the present invention should not be limited to these embodiments, but many changes and variations may be made without departing from the spirit and the scope of the invention. For example, in the respective embodiments, the air bag case used in the air bag apparatus for the front-seat passenger has been described, but it must be noted that the air bag apparatus should not be limited to the apparatus for the front-seat passenger.

What is claimed is:

1. An air bag case which can accommodate an inflator and a bag body, said inflator capable of generating gas to expand said bag body when a vehicle rapidly decelerates, said air bag case comprising:
    a main plate portion including an intermediate portion which is curved so as to form a space for accommodating said inflator and said bag body inside said main plate; and
    a pair of side plate portions formed by bending both sides of said main plate portion in an inner direction of said main plate portion, said pair of side plate portions respectively serving to join side edges of said side plate portions opposed to each other, and forming an inflator accommodating opening which is provided in said side plate portions in a vicinity of said intermediate portion of said main plate portion 2. An air bag case according to claim 1, wherein said pair of side plate portions respectively have a pair of joining portions corresponding to said side edges, and said pair of joining portions being joined with each other so as to join respective side edges of said main plate portion opposed to each other.

3. An air bag case according to claim 2, wherein said pair of joining portions are joined to each other by performing one of welding and clamping.

4. An air bag case according to claim 2, further comprising:
    a first coupling member secured to each of said pair of side plate portions to cause said pair of joining portions to contact each other.

5. An air bag case according to claim 2, further comprising:
    a second coupling member secured to each of said pair of side plate portions, and secured to an end of a bag body expansion opening provided in said main plate portion to cause said pair of joining portions to contact each other, and to have an opening portion which is provided in said bag body and mounted on said main plate portion and said pair of side plate portions.

6. An air bag case according to claim 2, wherein said pair of joining portions are respectively provided with mounting portions of said vehicle, said air bag case being mounted on said vehicle through said mounting portions of said vehicle.

7. An air bag case according to claim 1, further comprising:
    a mounting member of a vehicle body which is provided corresponding to each of said pair of side plate portions, and has one end secured to one corresponding side plate portion of said pair of side plate portions and the other end secured to said vehicle body to secure said air bag case to said vehicle body.

8. An air bag case according to claim 1, wherein said main plate portion is curved so as to have a substantially U-shaped section.

9. An air bag case which can accommodate an inflator and a bag body, said inflator capable of generating gas to expand said bag body when a vehicle rapidly decelerates, said air bag case comprising:
    a main plate portion having an opposing portion forming a space for accommodating said inflator and said bag body inside said main plate portion, and having a curved portion which is curved to have a substantially U-shaped intermediate portion; and
    a pair of side plate portions formed by bending both sides of said main plate portion in an inner direction of said main plate portion, said pair of side plate portions respectively forming crossing portions for joining side edges of said side plate portions opposed to each other, and forming an opening forming portion forming an inflator accommodating opening in the vicinity of said curved portion.

10. An air bag case according to claim 9, wherein said pair of side plate portions are respectively provided with a pair of flanges at ends of said crossing portions, and said pair of flanges being joined so as to join said crossing portions.

11. An air bag case according to claim 10, wherein said pair of flanges are joined to each other by performing one of welding and clamping.

12. An air bag case according to claim 10, further comprising:
    a first coupling member secured to said respective crossing portions of said pair of side plate portions, and causing said pair of flanges to contact each other.

13. An air bag case according to claim 10, further comprising:
    a second coupling member clamped to said respective crossing portions of said pair of side plate portions, and secured to an end of a bag body expansion opening provided in said main plate portion so as to cause said pair of flanges to contact each other, and so as to mount an opening portion provided in said bag body on said main plate portion and said pair of side plate portions.

14. An air bag case according to claim 10, wherein said pair of flanges are respectively provided with a mounting hole of said vehicle, said air bag case being mounted on said vehicle by a bolt passing through said mounting hole of said vehicle to fix said air bag case to said vehicle.

15. An air bag case according to claim 10, further comprising:
    a mounting member of a vehicle body which is provided for one of said crossing portions, and has one end secured to said corresponding crossing portion and the other end secured to said vehicle body to fix said air bag case on said vehicle body.

16. An air bag case according to claim 9, wherein said pair of side plate portions are respectively provided with superposed portions at ends of said crossing portions, said superposed portions being formed by providing a step portion for said one crossing portion, and superposing said one crossing portion on the other crossing portion on the outside of said vehicle.

17. An air bag case according to claim 16, wherein said superposed portions are respectively joined to each other by performing one of welding and clamping.

18. An air bag case according to claim 16, further comprising:
    a pair of first coupling members which are secured to said respective crossing portions of said pair of side plate portions, and serve to secure said superposed portions to each other.

19. An air bag case according to claim 16, further comprising:
    a second coupling member which is clamped to said respective crossing portions of said pair of side plate portions and said superposed portions, and serves to mount an opening portion on said main plate portion and said pair of side plate portions, said opening portion being clamped to an end of a bag body expansion opening provided in said main plate portion and provided in said bag body.

20. An air bag case according to claim 16, further comprising:
    a mounting member of a vehicle body which is provided for one of said crossing portions, and has one end secured to said corresponding crossing portion and the other end secured to said vehicle body to fix said air bag case to said vehicle body.

* * * * *